Dec. 21, 1926.
V. E. JOHANSEN
1,611,642
AUTOGRAPHIC ATTACHMENT FOR CAMERAS
Filed June 21, 1926
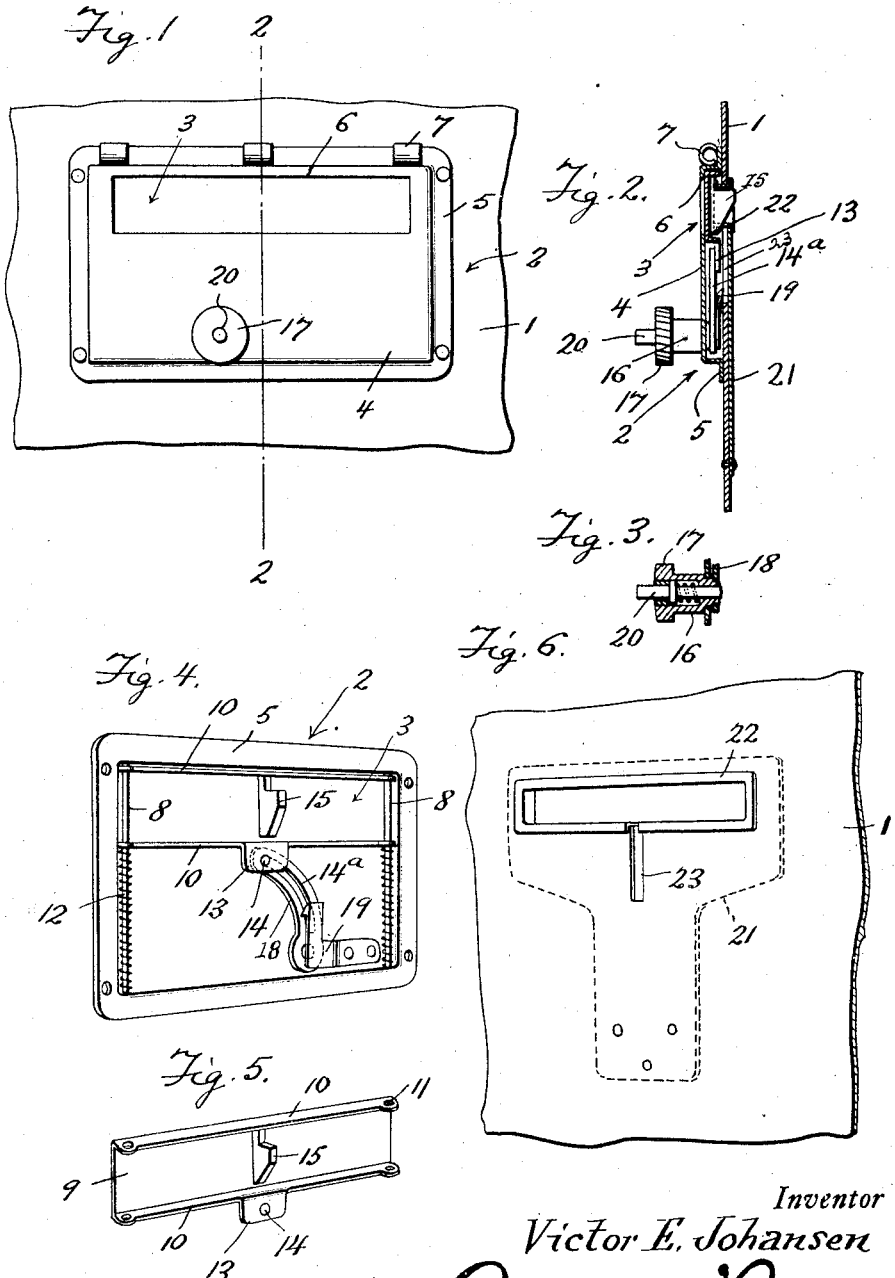
Inventor
Victor E. Johansen
By Clarence A. O'Brien
Attorney Patented Dec. 21, 1926.

1,611,642

UNITED STATES PATENT OFFICE.

VICTOR E. JOHANSEN, OF OAKLAND, CALIFORNIA.

AUTOGRAPHIC ATTACHMENT FOR CAMERAS.

Application filed June 21, 1926. Serial No. 117,421.

This invention relates to an improved device which may be conveniently referred to as a camera attachment, the same having more particular reference to a device of this kind which is used on the back of the camera casing to aid in the autographing of films.

My principal aim is to generally improve upon devices of this class by providing one of comparative simplicity and durability which may be applied to well known forms of cameras in place of the autographic devices now employed.

Briefly, the invention has reference to a spring-pressed shutter to cover the opening through which the back of the film is exposed for autographing, this shutter being associated with a novel mounting or attaching plate and carrying efficient means for moving the shutter to open position and for allowing it to literally slide back, whereby to prevent undue exposure of the impression on the film.

The features of the improved construction, and the advantages thereof will become apparent from the following description and drawings.

In the drawings:—

Figure 1 is a rear elevation of the complete device showing the shutter in closed position, Fig. 2 is a vertical section taken approximately upon the plane of the line 2—2 of Fig. 1, looking in a direction from right to left.

Fig. 3 is a sectional view of one of the details,

Fig. 4 is an inside perspective view of the attachment,

Fig. 5 is an inside perspective view of the sliding shutter, and

Fig. 6 is a similar view of a fragmentary portion of the back of the camera showing some of the parts in position.

Referring to the drawings in detail, it will be seen that the reference character 1 designates the back of the camera, the reference character 2 designates generally the attaching plate, and the reference character 3, the improved shutter.

The plate 2 is of general rectangular configuration in outline and embodies an outwardly pressed portion 4 having a marginal attaching flange 5 and provided at its top with an elongated opening 6 through which the usual stylus is inserted. The plate is preferably provided at the top with holders 7 for the stylus (not shown).

Referring now to Fig. 4, it will be seen that the plate is provided adjacent its opposite ends with a pair of guide rods 8 upon which the shutter 3 is slidably mounted. The shutter, as shown better in Fig. 5, comprises a narrow strip of metal 9 provided with top and bottom flanges 10 formed at their ends with apertured ears 11 for passage of the guide rods 8. It will be noted that small coiled springs 12 surround the lower portions of these rods and serve to press the shutter upwardly to closing position. In addition, the shutter is provided on its bottom with a depending lip 13 carrying a stud 14 and above this lip is an outstanding lug 15 to press against the film.

Attention is now directed to Fig. 3, wherein it will be seen that a sleeve 16 is mounted for rotation in an opening in the plate and this sleeve is provided on its outer end with a finger knob 17. At its inner end, it is fastened to a longitudinally curved link 14a having a slot through which the aforesaid stud 14 passes. It is obvious that this arrangement by turning the knob, the link will act on the stud to pull the shutter 3 downwardly against the action of the spring 12. When thus moved downwardly, it is obvious that the resilient latch 19 riveted on the back of the attaching plate as shown plainly in Fig. 4 is engaged with the adjacent flange 10. Then, there is a spring pressed plunger 20 carried by the sleeve 16 and extending through it so that it may be engaged with the latch for disengaging the same from the flange.

As shown in Fig. 6, a peculiarly shaped reinforcing and backing member 21 is fastened to the inside of the back of the camera, and this is provided with an opening in registry with a similar opening formed in the back of the camera. Also an elongated frame 22 is fitted into this opening and is held in place as shown in Fig. 2. Moreover, a vertical slot 23 is provided in the back of the camera to accommodate the sliding movement of the keeper. This member 21 presses against the film to hold it taut while making the inscription thereon. With the arrangement shown, it will be seen that the keeper when moving downwardly, will press this member 21 inwardly to bear against the film for the purpose stated.

In practice, it is obvious that the shutter 3 is normally closed under the action of the springs 12. When it is desired, however, to make an impression upon the back of the film in the usual way, the knob 17 is grasped and the sleeve 16 is turned in such a way as to cause the link 14ª and the stud 14 to cooperate to move the shutter downwardly against the action of the springs, thus uncovering the opening 6 and exposing the film to fit the stylus to be inserted.

From the foregoing description and drawings, it will be seen that I have evolved and produced a novel device which is superior in operation and rapidity of action to facilitate autographing films. The device is easy to operate, is practical and possesses other obvious advantages and features. No doubt, however, a clear understanding of the invention has now been obtained, and a more lengthy description need not be entered.

Minor changes coming within the field of invention claimed may be resorted to if desired.

Having thus described my invention, what I claim as new is:—

1. In a structure of the class described, an attaching plate provided with a stylus opening, a shutter slidably mounted upon the plate, spring means for automatically closing the shutter, manually operated means for opening the shutter, a latch for holding the shutter in open position, and means for releasing the latch.

2. In a structure of the class described, an attaching plate provided with a stylus opening, a shutter slidably mounted upon the plate and adapted to cover the opening, means for automatically closing the shutter, and retaining and operating means for the shutter.

In testimony whereof I affix my signature.

VICTOR E. JOHANSEN.